(12) United States Patent
Sinclair et al.

(10) Patent No.: US 10,991,161 B2
(45) Date of Patent: Apr. 27, 2021

(54) GENERATING VIRTUAL REPRESENTATIONS

(71) Applicant: Signaturize Holdings Ltd, London (GB)

(72) Inventors: Jonathan Sinclair, London (GB); Robert Lewis, London (GB); James Nicholl, London (GB); Ciaran Harrigan, London (GB)

(73) Assignee: Signaturize Holdings Ltd, London (GB)

( * ) Notice: Subject to any disclaimer, the term of this patent is extended or adjusted under 35 U.S.C. 154(b) by 0 days.

(21) Appl. No.: 16/400,638

(22) Filed: May 1, 2019

(65) Prior Publication Data

US 2019/0340814 A1 Nov. 7, 2019

(30) Foreign Application Priority Data

May 4, 2018 (GB) ..................................... 1807361

(51) Int. Cl.
*G06T 17/20* (2006.01)
(52) U.S. Cl.
CPC ........ *G06T 17/205* (2013.01); *G06T 2210/04* (2013.01)
(58) Field of Classification Search
None
See application file for complete search history.

(56) References Cited

U.S. PATENT DOCUMENTS

| | | |
|---|---|---|
| 8,976,172 B2 | 3/2015 | Jones |
| 2014/0293016 A1 | 10/2014 | Benhimane et al. |

(Continued)

FOREIGN PATENT DOCUMENTS

| | | |
|---|---|---|
| EP | 3 489 627 A1 | 5/2019 |
| WO | WO 2016/044037 A1 | 3/2016 |
| WO | WO 2017/215899 A2 | 12/2017 |

OTHER PUBLICATIONS

U.S. Appl. No. 62/542,714, specification (Year: 2017).*

(Continued)

*Primary Examiner* — Nurun N Flora
(74) *Attorney, Agent, or Firm* — Daly, Crowley, Mofford & Durkee, LLP

(57) ABSTRACT

Methods, computer systems and computer programs for generating a virtual representation of an interior space such as a room are provided. Techniques for capturing and normalizing sets of points for polygon mesh generation that utilize augmented reality toolkits are also described. The methods comprise: obtaining a first set of three-dimensional coordinates and at least one further set of three-dimensional coordinates, wherein the first set of three-dimensional coordinates comprises three-dimensional coordinates representing three-dimensional positions of points located on edges of walls of the interior space, and wherein each of the at least one further set of three-dimensional coordinates comprises three-dimensional coordinates representing positions of points located on edges of an extrusion in one of the walls of the interior space; and generating a polygon mesh representing the three-dimensional shape of the interior space, wherein generating the polygon mesh comprises: using the first set of three-dimensional coordinates to determine planes representing the walls of the interior space without considering any extrusions in the walls; and for each wall with one or more extrusions, using the respective determined plane and the respective one or more of the at least one further set of three-dimensional coordinates to determine a plurality of sub-meshes that in combination represent the respective wall excluding the respective one or more extrusions; and combining the plurality of sub-meshes into a mesh representing the wall with the one or more extrusions.

23 Claims, 11 Drawing Sheets

(56) References Cited

U.S. PATENT DOCUMENTS

| | | | |
|---|---|---|---|
| 2015/0070387 A1 | 3/2015 | Schmalstieg et al. | |
| 2015/0363966 A1 | 12/2015 | Wells et al. | |
| 2016/0055268 A1 | 2/2016 | Bell et al. | |
| 2016/0253842 A1 | 9/2016 | Shapira et al. | |
| 2017/0329488 A1 | 11/2017 | Welker et al. | |
| 2018/0075663 A1 | 3/2018 | Steed et al. | |
| 2018/0095276 A1 | 4/2018 | Ng-Thow-Hing | |
| 2018/0268220 A1* | 9/2018 | Lee | G06K 9/4642 |
| 2019/0051054 A1* | 2/2019 | Jovanovic | G06T 7/70 |

OTHER PUBLICATIONS

U.S. Appl. No. 62/542,714, drawing (Year: 2017).*
U.S. Appl. No. 62/542,714, claims (Year: 2017).*
UK Search Report for Appl. No. GB1807361.9 dated Dec. 28, 2018; 5 pages.
GB Search Report under Section 17(6) dated Oct. 7, 2019 for British Application No. GB1807361.9; 3 Pages.
U.S. Appl. No. 16/400,633, filed May 1, 2019, Sinclair, et al.
UK Search Report for Appl. No. GB1807690.1 dated Dec. 28, 2018; 4 pages.
Invitation to Pay fees and Partial Search Reporting and Written Opinion dated May 29, 2019 for PCT Application No. PCT/GB2019/051181, 17 pages.
Budroni et al. "Automated 3D Reconstruction of Interiors from Point Clouds", International Journal of Architectural Computing, Issue 01, vol. 8, Jan. 1, 2010, 18 pages.
Mura et al. "Automatic Room Detection and Reconstruction in Cluttered Indoor Environments with Complex Room Layouts" Computers & Graphics, 44 (2014) 20-32, Nov. 1, 2014, 13 pages.
PCT International Search Report dated Jul. 11, 2019 for International Application No. PCT/GB2019/051181; 6 pages.
PCT Written Opinion dated Jul. 11, 2019 for International Application No. PCT/GB2019/051181; 14 pages.
Mura, et al., "Automatic Room Detection and Reconstruction in Cluttered Indoor Environments with Complex Room Layouts;" Computers and Graphics, vol. 44; Nov. 2014; 13 Pages.
Budroni, et al., "Automated 3D Reconstruction of Interiors from Point Clouds;" International Journal of Architectural Computing; Jan. 2010; 21 Pages.
U.S. Non-Final Office Action dated Jun. 10, 2020 for U.S. Appl. No. 16/400,633; 15 Pages.
Response to U.S. Non-Final Office Action dated Jun. 10, 2020 for U.S. Appl. No. 16/400,633; Response filed Sep. 9, 2020; 9 Pages.
U.S. Non-Final Office Action dated Oct. 5, 2020 for U.S. Appl. No. 16/400,633; 12 Pages.
PCT International Search Report dated Jul. 1, 2016 for PCT Application No. PCT/US2015/049274; 2 Pages.
Steinbrucker, et al., "Large-Scale Multi-Resolution Surface Reconstruction from RGB-D Sequences;" Downloaded from https://openaccess.thecvf.com/content_iccv_2013/papers/Steinbrucker_Large-Scale_Multi-resolution_Surface_2013_ICCV_paper.pdf; Dec. 1, 2013; 8 Pages.
Johannsson, et al., "Temporally Scalable Visual SLAM Using a Reduced Pose Graph;" Downloaded from http://people.csail.mit.edu/kaess/pub/Johannsson12rssw.pdf; May 6, 2013; 8 pages.
Whelan, et al., "Kintinuous: Spatially Extended KinectFusion;" Downloaded from http://www.thomaswhelan.ie/Whelan12rssw.pdf; Jul. 2012; 8 Pages.
Roth, et al., "Moving Volume KinectFusion;" Downloaded from http://www.bmva.org/bmvc/2012/BMVC/paper112/abstract112.pdf; Jan. 2012; 1 Page.
Blender Made Easy, Blender Tutorial Creating a Low Poly Interior; https://youtu.be/UWyER_hax_A; Jul. 31, 2018.
Blender Guru, Blender Tutorial: Architectural Interior; Part 1; https://youtu.be/p5q_P8WQegQ; Dec. 7, 2016.
Blender Guru, Blender Tutorial: Architectural Interior; Part 2; https://youtu.be/l685JGTCpCU; Dec. 8, 2016.

* cited by examiner

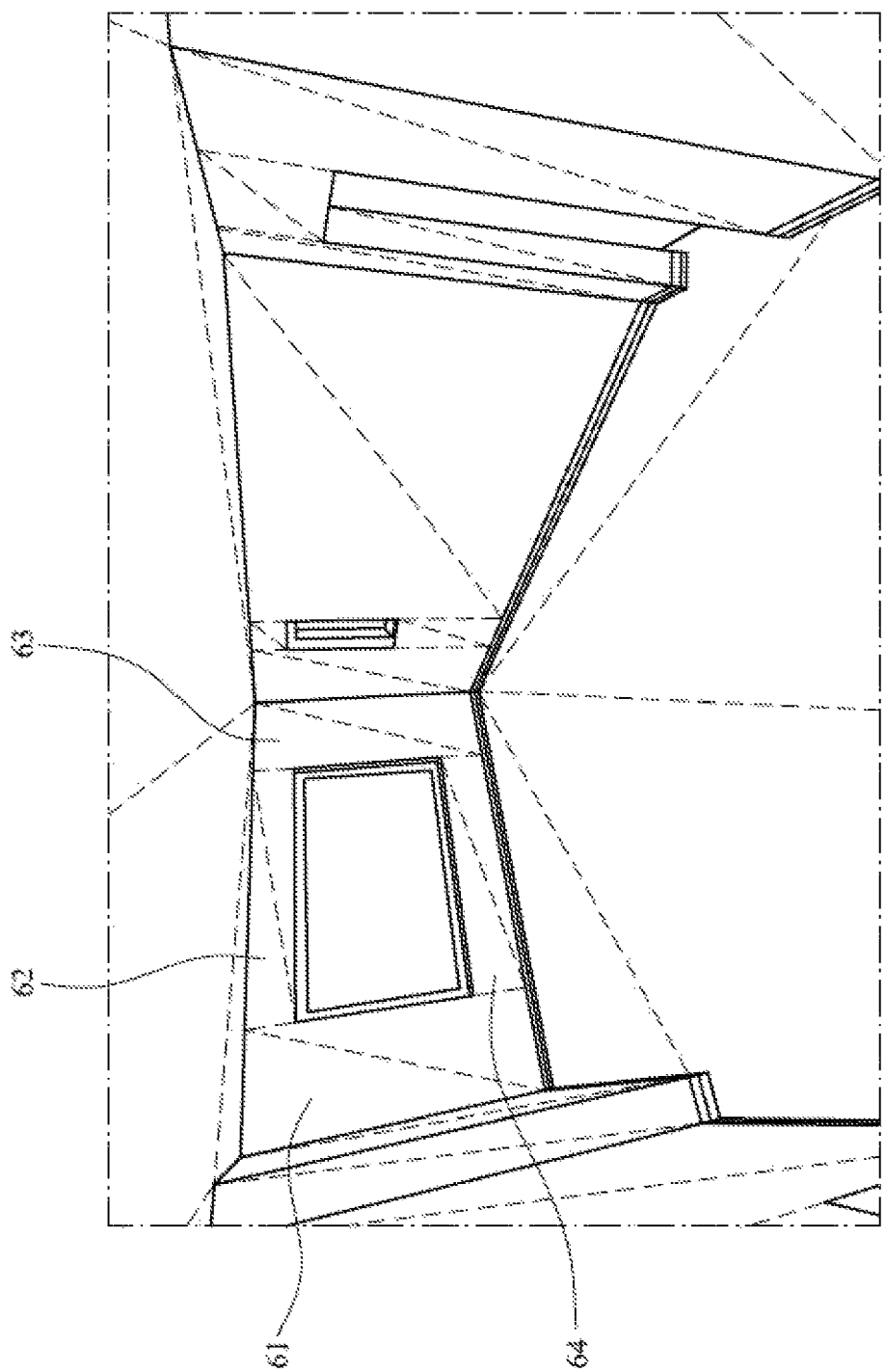

GENERATING VIRTUAL REPRESENTATIONS

PRIORITY STATEMENT

This application claims priority under 35 U.S.C. § 119 to UK Application No. GB1807361.9 filed on May 4, 2018, the contents of which is hereby incorporated herein by reference in its entirety.

TECHNICAL FIELD

The invention relates to methods, computer programs and computer systems for generating virtual representations, in particular, virtual representations of three dimensional interior spaces such as rooms.

BACKGROUND

Virtual representations of three dimensional objects and spaces may be generated for various reasons. For example, virtual representations of environments, buildings, objects and people may be generated for films, animation and gaming; virtual representations of anatomical objects may be generated for medical imaging; and virtual representations of buildings, rooms and objects within buildings and rooms may be generated for architectural and interior design purposes.

Some techniques for generating virtual representations of objects and spaces involve the generation of a polygon mesh (sometimes called a wireframe model), typically made up of triangles, that approximates the 3D shape of the object or space for which the virtual representation is to be generated. The mesh is then input to a rendering engine which uses techniques such as shading and texture mapping to convert the mesh into a virtual representation of the 3D object or environment for display on a screen. Rendering techniques and engines for converting a mesh into an image are well-known and will not be described in further detail.

Generating a polygon mesh for input to a rendering engine typically involves applying a mesh-generation technique to an array of predefined vertices (three-dimensional coordinates of surface points of the object or space). According to some known polygonal modelling techniques:

- An array of edges which connect pairs of the vertices is generated (or may itself be predefined, in an edge table for example);
- Using the array of edges, all polygons (typically triangles), which are closed sets of the edges, are generated;
- All polygons on the same face plane are combined;
- All polygon faces which are in the same horizontal or vertical plane are grouped; and
- All groups of polygon faces are combined to form the 3D polygonal mesh of the object or space being modelled.

The predefined vertices that are used as an input to the mesh-generation algorithm may be sourced from anywhere, but typically must be highly accurate if the mesh-generation algorithm is to produce a mesh that accurately represents the shape of the 3D object. For generating meshes of buildings and interior spaces such as rooms of buildings, vertices are often captured using specialized equipment such as a laser rangefinder, operated by trained individuals. The complexity of the vertex capture process may therefore mean that mesh generation, particularly for interior spaces, is not accessible to untrained users and is not amenable to real-time or near-real time applications.

SUMMARY OF THE INVENTION

Embodiments described herein address problems with known techniques for generating meshes that are used as inputs of a rendering engine, and provide for the real-time generation of virtual representations of interior spaces such as rooms.

The inventors have appreciated that some known mesh generation techniques, while effective, may be computationally demanding. This is especially problematic for mobile devices such as smart phones and tablets, which have limited processing capabilities and battery life. Embodiments described herein provide for efficient mesh generation, which allows for the real-time or near-real-time generation of a virtual representation of a space, including by mobile devices.

Further, the inventors have appreciated that existing vertex capture techniques limit the accessibility of virtual generation of interior spaces, and limits real-time or near-real time generation of virtual representations of spaces. Embodiments described herein provide mesh generation techniques which can make use of vertices captured without specialized equipment and skills, and so permits all kinds of users to generate virtual representations in real time or near-real time. Techniques for capturing vertices are also provided.

The scope of protection is defined in the independent claims to which reference is now directed. Optional features are set out in the dependent claims.

According to a first aspect of the present invention, there is provided a method for generating a virtual representation of an interior space such as a room. The method comprises obtaining a first set of three-dimensional coordinates and at least one further set of three-dimensional coordinates. The first set of three-dimensional coordinates comprises three-dimensional coordinates representing three-dimensional positions of points located on edges of walls of the interior space. Each of the at least one further set of three-dimensional coordinates comprises three-dimensional coordinates representing positions of points located on edges of an extrusion in one of the walls of the interior space. The method further comprises generating a polygon mesh representing the three-dimensional shape of the interior space. Generating the polygon mesh comprises using the first set of three-dimensional coordinates to determine planes representing the walls of the interior space without considering any extrusions in the walls; and for each wall with one or more extrusions, using the respective determined plane and the respective one or more of the at least one further set of three-dimensional coordinates to determine a plurality of sub-meshes that in combination represent the respective wall excluding the respective one or more extrusions; and combining the plurality of sub-meshes into a mesh representing the wall with the one or more extrusions.

Generating a mesh that represents a very simple space which does not have any extrusions such as doors, windows and fireplaces in its walls may be relatively straightforward. However, extrusions, which are present in most rooms, may vastly increase the complexity of some known mesh generation techniques. This is because extrusions quickly increase the number of three-dimensional coordinates/vertices required to represent the space, such that the number of edges connecting vertices and the number of polygons connecting edges vastly increases. Additionally, vertices representing the extrusions can be encapsulated within the edges representing the walls, which creates complex shapes for which the calculation of polygons is also complex.

In contrast to these known techniques in which polygons are calculated for a complex shape which includes vertices for both the wall and the extrusions, the present invention stores and considers the array of vertices which represent the walls of the interior space (without any extrusions in the walls) and the arrays of vertices which represent the extrusions separately. This allows the complex shape to be separated into simple shapes, for which polygons can be efficiently calculated, before recombining the resulting meshes into a mesh representing the complex shape. Overall, this enables a more computationally efficient approach to calculating polygon meshes of complex interior spaces, which in turn allows for the real-time or near real-time generation of virtual spaces on mobile devices such as smart phone or tablet computers.

According to a second aspect of the present invention, there is provided a method for generating a virtual representation of an interior space such as a room. The method comprises obtaining a first set of three-dimensional coordinates. The first set of three-dimensional coordinates comprises three-dimensional coordinates representing three-dimensional positions of points located on edges of walls of the interior space. The method further comprising generating a polygon mesh representing the three-dimensional shape of the interior space. Generating the polygon mesh comprises normalizing the three-dimensional coordinates of the first set of three-dimensional coordinates to account for capture drift; using the normalized first set of three-dimensional coordinates to determine planes representing the walls of the interior space; and using the determined planes representing the walls of the interior space to determine polygon meshes representing the walls of the interior space.

Normalization of the three-dimensional coordinates can also be applied to the first and/or at least one further set of three-dimensional coordinates of the first aspect of the present invention.

Capture drift, which may occur if the calibration of the electronic device used to capture the three-dimensional coordinates drifts during the capture process, may result in improperly aligned planes, or planes that do not accurately represent the interior space. Normalizing the coordinates before further processing ensures that the planes representing the walls of the interior space are properly aligned and form angles that accurately represent the actual interior space.

Normalizing the three-dimensional coordinates of the first set of three-dimensional coordinates and/or the at least one further set of three-dimensional coordinates may comprise comparing an angle between two planes to a predetermined threshold angle, and adjusting at least one three-dimensional coordinate if the angle passes the threshold. The planes may be planes representing walls or planes representing a ceiling or floor. The use of a threshold allows angles that are due to the actual shape of the interior space to be distinguished from angles that exist in the obtained sets of three-dimensional coordinates due to capture drift and/or inaccuracies in point capture.

The method may comprise, for each wall without any extrusions, using the corresponding plane to determine a mesh representing the wall. In this way, polygon meshes representing all walls of the interior space are obtained so that a virtual representation of the entire interior space can be generated.

The method may comprise providing one or more polygon meshes to a renderer for rendering the one or more polygon meshes, wherein each of the one or more polygon meshes represents the three-dimensional shape of one or more walls of the interior space. In some cases, the method may comprise combining all of the meshes representing all of the walls of the interior space to give a single mesh representing the three-dimensional shape of the interior space, and providing the single polygon mesh representing the three-dimensional shape of the interior space to a renderer for rendering. Providing the renderer with a single mesh may reduce processing and memory bandwidth requirements. In other cases, the method may comprise providing a plurality of groups of polygon meshes to the render, each group representing one or more wall. Providing the renderer with polygon meshes separately or in groups, rather than in combination, may allow re-rendering the mesh of one or more walls without re-rendering the meshes of all other walls. This allows users to make changes to a wall, at the level of the mesh and/or renderer, without having to perform computationally demanding rendering for the entire interior space.

The method may comprise determining, for each of the at least one further set of three-dimensional coordinates, which of the determined planes the extrusion belongs to. Determining which of the determined planes the extrusion belongs to may comprise comparing the orientation of a plane through the points representing positions of points located on edges of the extrusion to the orientation of the determined planes. This allows the association between a wall and an extrusion to be determined without obtaining a single set of points that includes both the wall and the extrusion, which as noted above increases the computational complexity of the mesh generation.

Using the respective determined plane and the respective one or more of the at least one further set of vertices to determine a plurality of sub-meshes that in combination represent the respective wall excluding the respective one or more extrusions may comprise translating or projecting the respective extrusion onto the respective plane. The extrusion may be parallelized to the plane prior to translating or projecting the extrusion onto the plane, which may reduce the effects of capture drift and inaccuracies in point capture which can cause the extrusion to be improperly aligned with its wall plane.

Using the respective determined plane and the respective one or more of the at least one further set of three-dimensional coordinates to determine a plurality of sub-meshes that in combination represent the respective wall excluding the respective one or more extrusions may further comprise dividing the plane less the extrusion into a plurality of sub-planes; and generating a sub-mesh for each sub-plane. In this way, a complex shape that encapsulates an extrusion can be divided into simple sub-planes (such as rectangles) for which mesh generation is particularly straightforward. The sub-meshes generated form the sub-planes can then be combined to create a mesh for the wall.

Dividing the plane less the extrusion into a plurality of sub-planes comprises performing an extrapolation technique. For example, the extrapolation technique may comprise dissecting, for each of the one or more extrusions, the plane along lines through a minimum and maximum extent of the extrusion. Extrapolation techniques may be particularly efficient for extrusions with a regular polygon cross-section in that they may generate sub-planes with particularly simple shapes, for which mesh-generation is particularly efficient.

Dividing the plane less the extrusion into a plurality of sub-planes may comprise performing a splicing technique. For example, the splicing technique may comprise, for each of the one or more extrusions, dissecting the plane through a central point of the extrusion. A splicing technique may be preferred to an extrapolation technique because it can be applied to both regular and irregular extrusions. Further, a splicing technique generates relatively few sub-planes, which reduces the number of sub-meshes that must be generated and subsequently combined.

The polygons of the polygon meshes may be triangles.

The first set of three-dimensional coordinates may comprise at least one three-dimensional coordinate for each vertical edge, wherein a vertical edge is an edge where two adjacent walls of the interior space meet. Capturing points located on vertical edges, possibly without capturing any points on horizontal edges, provides for fast point capture while still allowing the determination of planes representing interior spaces with complex wall configurations.

The first set of three-dimensional coordinates may comprise a three-dimensional coordinate for each horizontal edge, wherein a horizontal edge is an edge where a wall of the interior space meets a ceiling or floor of the interior space. Capturing points on horizontal edges, possibly in addition to points on vertical edges, allows interior spaces with non-uniform floors and ceilings to be accurately captured.

The first set of three-dimensional coordinated may comprise a height point indicating the height of the interior space. This may allow for the accurate determination of wall planes without having to capture points on horizontal edges.

Obtaining the first set of three-dimensional coordinates may comprise: displaying, on a display of an electronic device, a live view of the interior space as captured by a camera of the electronic device; and for each of the edges, receiving a user input indicating a point on the display corresponding to the edge; converting the user input into a three-dimensional coordinate; and storing the three-dimensional coordinate in memory of the electronic device. Likewise, obtaining each of the at least one further set of three-dimensional coordinates may comprises: displaying, on a display of an electronic device, a live view of the interior space as captured by a camera of the electronic device; and for each of the extrusions, receiving user inputs indicating points on the display corresponding to the edges of the extrusion; converting the user input into the three-dimensional coordinates; and storing the three-dimensional coordinates in memory of the electronic device. An augmented reality toolkit of the electronic device may provide the ability for three-dimensional interpretation of the live camera feed in order to convert the user inputs into the three-dimensional coordinates.

Augmented Reality Toolkits such as ARKit included in Apple's (Registered Trade Mark) iOS 11 and ARCore included in Google's (Registered Trade Mark) most recent version of the Android (Registered Trade Mark) operating system can provide the ability for three-dimensional interpretation of a live camera feed, such that three dimensional coordinates of points displayed on the screen of a device can be determined. This allows vertex capture to be performed quickly and without the use of specialized equipment and/or software that is not available to most users.

The user input may be converted into a three-dimensional coordinate and stored in ° memory as soon as the user input is received. This significantly reduces the effect of capture drift. While subsequent normalization of the three-dimensional coordinates is possible, it is desirable to reduce the amount of capture drift in the first place.

Obtaining the first set of three-dimensional coordinates and/or the at least one further set of three-dimensional coordinates may comprise retrieving a previously captured set of vertices from memory of an electronic device.

A computer program, such as a mobile app, comprising instructions which when executed by a computer cause the computer to perform the method for generating a virtual representation of an interior space such as a room is also provided.

A non-transitory computer-readable medium storing instructions which, when executed by a computer, cause the computer to perform the method for generating a virtual representation of an interior space such as a room is also provided. It will be understood that the non-transitory computer readable medium may be a medium such as, but not limited to, a CD, a DVD, a USB storage device, flash memory, a hard disk drive, ROM or RAM.

A computer system comprising one or more processors communicatively coupled to memory and configured to perform the method for generating a virtual representation of an interior space such as a room is also provided.

BRIEF DESCRIPTION OF THE DRAWINGS

The invention will now be further described by way of example only and with reference to the accompanying figures in which:

FIGS. 6A-6H are schematic diagrams illustrating some of processes of FIG. 5.

Like reference numbers are used for like elements throughout the description and figures.

DETAILED DESCRIPTION

Figure 1:
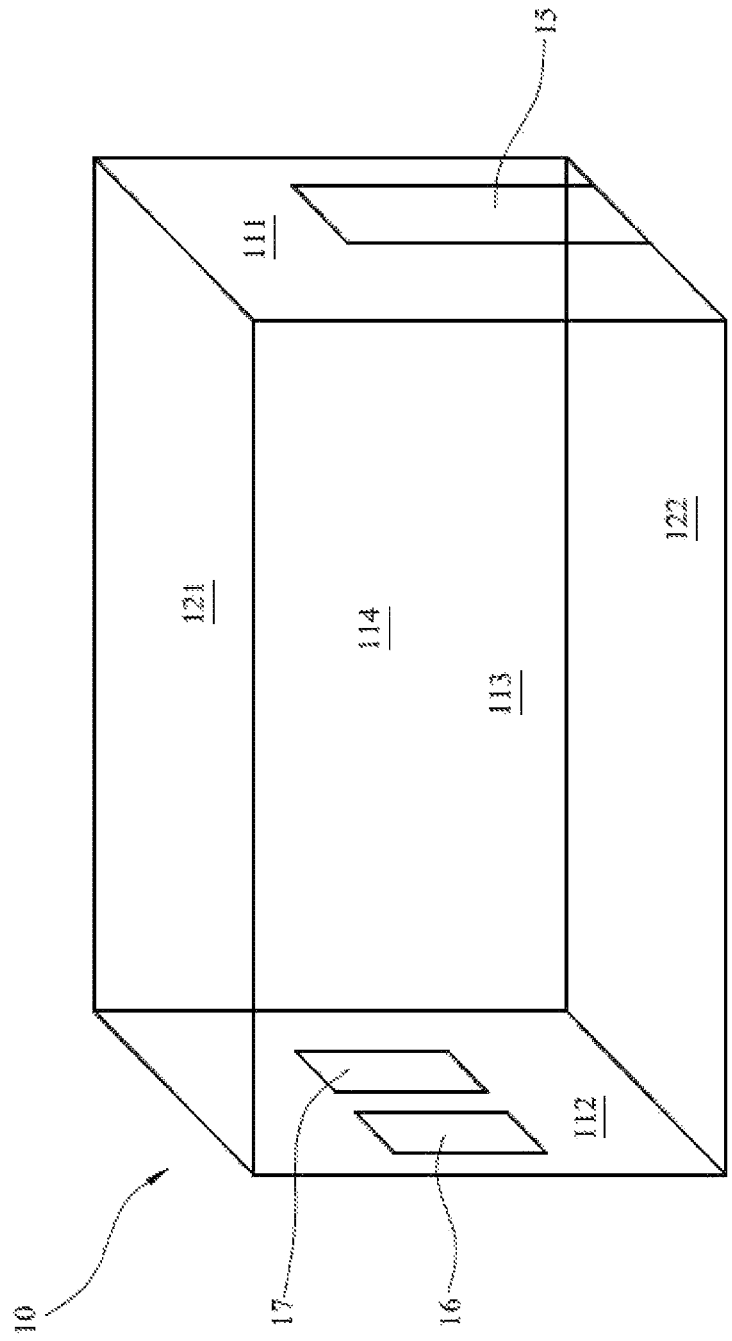
FIG. 1 is a schematic diagram of an exemplary interior space with walls and extrusions in the walls.

By way of an example, FIG. 1 illustrates a three-dimensional interior space 10 for which a virtual representation may be generated.

The interior space 10 includes interior surfaces 111, 112, 113, 114, 121 and 122. Interior surfaces 111-114 are walls of the interior space 10, whereas interior surface 121 is a ceiling and interior surface 122 is a floor of the interior space 10. In FIG. 1, walls 111 and 112 are opposite to each other, and walls 113 and 114 are opposite each other with wall 113 in the foreground and wall 114 in the background.

The interior surfaces of the interior space 10 have vertical edges (not numbered) where two adjacent walls meet, and horizontal edges (also not numbered) where a wall meets either the ceiling 121 or the floor 122. The interior space 10 also has corners (not numbered) where two adjacent walls meet either the ceiling 121 or the floor 122. In this description, unless the context dictates otherwise, a point said to be "located on an edge" of an interior surface such as a wall 111-114, ceiling 121 and floor 122 may refer to a point on a vertical edge (where two adjacent walls meet), a point on a horizontal edge (where a wall and a floor/ceiling meet) or a corner point (where two adjacent walls and either a ceiling or floor meet).

The interior space 10 illustrated in FIG. 1 has very simple interior surfaces 111-114, 121, 122, and it should be appreciated that a simple interior space 10 has been chosen for ease of illustration and explanation. For example, while the interior space 10 has four walls at 90 degrees to each other, interior spaces can have more or fewer walls, with the angle between adjacent walls being greater or less than 90 degrees. Further, while the interior space 10 has a ceiling 121 with a uniform height, such that each of the walls 111-114 has the same uniform height, the ceiling 121 could have multiple different heights or be sloped, such that the walls 111-114 could be of different or non-uniform heights.

It should also be appreciated that the terms "vertical" and "horizontal" are used in this description to differentiate between edges where two walls meet and edges where a wall an either the ceiling or floor meet, and not to exclude edges that form an angle with the true vertical and true horizontal. Although the edges of the interior space 10 are vertical and horizontal, interior spaces with sloped walls, floors and ceiling exist, but for the purposes of this description are described as having "vertical edges" and "horizontal edges".

Returning to the interior space 10 of FIG. 1, some of the interior surfaces 111-114, 121, 122 of the interior space 10 have extrusions, 15, 16 and 17. In particular, wall 111 has an extrusion 15 in the form a door, and wall 112 has two extrusions 16, 17 in the form of two windows.

The term "extrusion" may refer to any feature of the interior space 10 which projects from or into an interior surface 111-114, 121, 122 of the interior space. Common examples of extrusions in interior spaces include windows, doors and fireplaces, but others exist. The extrusions 15-17 of FIG. 1 are rectangular, but extrusions can generally be of any shape, including regular polygons, irregular polygons, and shapes with curved edges. While the extrusions 15-17 are not shown as having any depth, it will be appreciated that this is merely for ease of illustration: in practice, extrusions project from or into an interior surface by at least some amount. It should also be appreciated that while the term "extrusion" is sometimes used to refer to an object of a fixed cross-section, this need not be case for extrusions in interior surfaces of an interior space 10. However, in many cases extrusions such as windows do have a uniform cross-section or at least a cross-section that is uniform for much of the depth of the extrusion.

The extrusions 15-17 have edges, which in the case of the extrusions 15-17 of FIG. 1 are vertical edges and horizontal edges (vertical and horizontal relative to the edges of the interior surfaces 111-114, 121, 122). However, the edges do not need to be horizontal or vertical: they could be sloped relative to the edges of the interior surfaces 111-114, 121, 122 or curved. The extrusions 15-17 of FIG. 1 also have corners where two edges meet. In this description, unless the context dictates otherwise, a point said to be "located on an edge" of an extrusion may refer to a point located on an edge which is straight or curved, and may also refer to a corner point where two or more edges meet.

The interior space 10 may be a room in a home, a room in a commercial space or other type of building, or indeed any other kind of interior space. Generally, any space which is at least partially enclosed by one or more interior surfaces may be considered to be an interior space for the purposes of this description.

Figure 2:
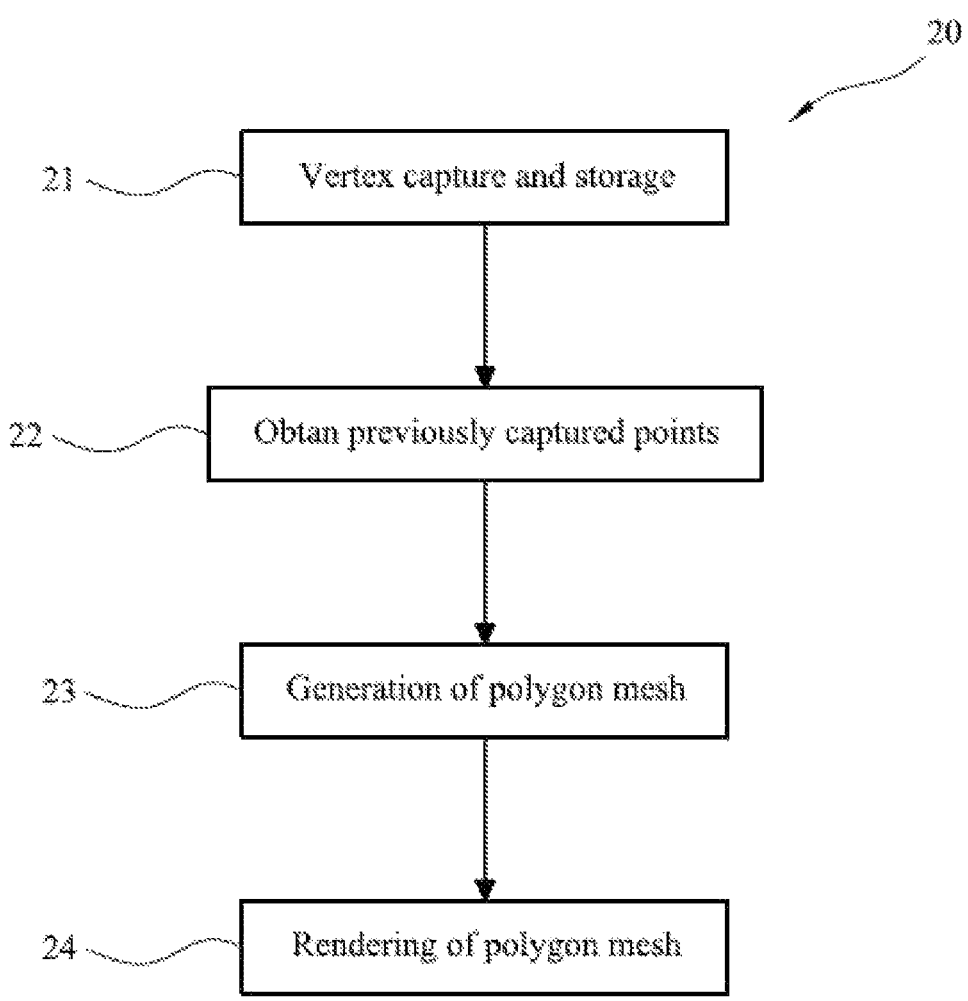
FIG. 2 is a flow diagram illustrating the processes involved in generating a virtual representation of an interior space.

FIG. 2 illustrates a process 20 of generating a virtual representation of an interior space, such as the interior space 10 of FIG. 1.

Firstly, in step 21, measurements are made to capture three-dimensional coordinates of points in the interior space 10. These three-dimensional coordinates are stored for access by an electronic device. The points that are captured, and techniques for capturing the points, are described in more detail below with reference to FIGS. 3 and 4A-4F.

Next, in step 22, an electronic device, for example a mobile device such as a smart phone or tablet computer, obtains the previously captured points. The previously captured points may have been captured using the electronic device itself, as discussed in more detail below with reference to FIGS. 3 and 4A-F. In this case, step 22 may take place temporally immediately after step 21. Alternatively, the capture process 21 may have taken place a more extended length of time before step 22, and may have taken place without the involvement of the electronic device that obtains the points.

Next, in step 23, the electronic device uses the obtained points to generate a polygon mesh representing the interior space. The generation of the polygon mesh will be described in more detail below with reference to FIGS. 5-6.

Finally, in step 24, the polygon mesh generated in step 23 is rendered, converting the mesh into a virtual representation of the interior space. The rendering 24 may take place immediately after the mesh is generated, or may take place at a later time using a stored version of the polygon mesh. The mesh may be rendered by the same electronic device that it used to generate polygon mesh, or another electronic device.

Figure 3:
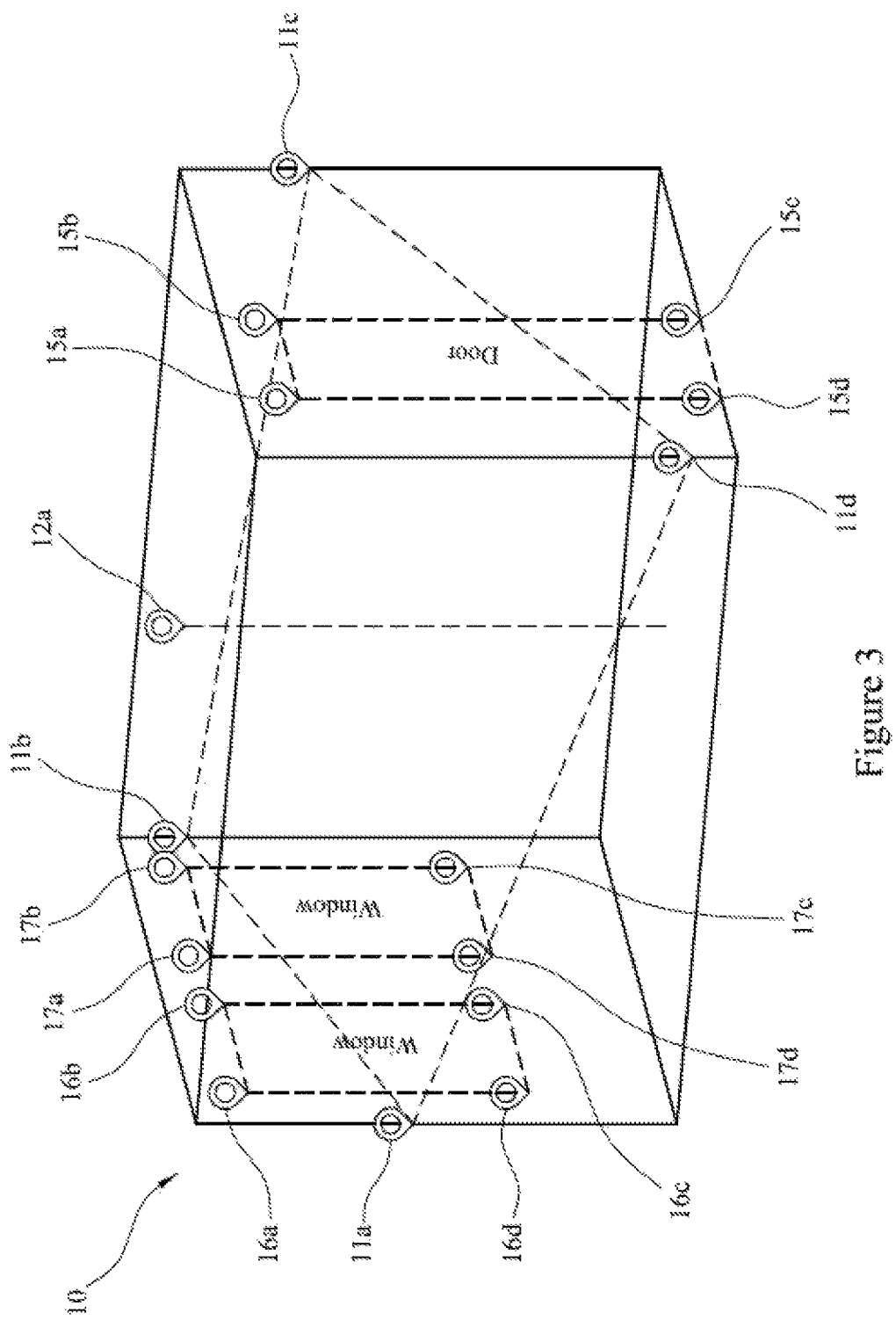
FIG. 3 is a schematic diagram illustrating the positions of vertices that are captured for the exemplary interior space of FIG. 1.

Now turning to FIG. 3, this illustrates exemplary points that may be captured in step 21 of the process 20 illustrated in FIG. 2, for the interior space 10 illustrated in FIG. 1.

The captured points include a first set of points which, as will be explained in more detail below, is used to generate planes representing the interior surfaces of the interior space. The first set of points comprises, for each vertical edge of the walls 111-114 of the interior space 10, a point 11a, 11b, 11c, 11d located on the vertical edge. The points 11a-d may be located anywhere along the length of their respective vertical edge, including the corners of the interior space 10 (that is, where two adjacent walls 111-114 meet either the floor 122 or ceiling 121). While embodiments described herein may only require one point per vertical edge, multiple points per vertical edge could also be captured. However, having multiple points per vertical edge may introduce redundancy in the information that is required to generate the planes representing the walls, and increase the amount of processing that is involved in generating the polygon mesh. Embodiments described herein aim to reduce both the amount of time taken to perform the point capture process and amount of processing required to generate a polygon mesh, so it may be preferable to limit the number of captured points where possible.

The first set of points optionally further comprises a height point 12a located on the ceiling 121 of the interior space. Where the ceiling 121 has multiple different heights, such that the walls 111-114 of the interior space are not all the same height, multiple height points may be captured. For example, one point per horizontal edge (where a wall 111-114 meets the ceiling 121) may be captured if the ceiling does not have a single height. Alternatively, a three-dimensional coordinate of a point 12a located on the ceiling 121 may not be captured at all. Instead, a default height or user-entered height may be used in steps 22 and 23 of the process shown in FIG. 2, especially where the interior space 10 only has a single height.

The first set of points optionally further comprises a floor point (not shown) located on the floor 122 of the interior space 10. However, if the coordinates of the other captured points are defined relative to an absolute zero that is located in the plane of the floor, no floor point is captured. This is often the case, for example if the points are captured using a calibrated piece of the equipment. Where the floor 122 is not level, one point per horizontal edge where a wall 111-114 meets the floor 122 may be captured.

It should be appreciated that due to the symmetry of the interior space 10, a different first set of points could be obtained that contains information equivalent to the first set of points described above. For example, rather than obtaining a first set of points that includes a height point 12a and a point 11a, 11b, 11c, 11d located on each vertical edge of the interior space 10, it would be possible to instead obtain a point located on each horizontal edge of the interior space and a point located on either wall 111 or wall 112. Other possibilities will be apparent to those skilled in the art. However, since many interior spaces have uniform floors and ceilings as interior space 10 does, yet many interior spaces have a wall configurations that are less uniform than that of the interior space 10 of FIG. 1, it may generally be preferable to capture points on vertical edges.

The obtained points also include at least one further set of points, each further set of points representing an extrusion in one of the walls of the interior space. In the case of the interior space 10 of FIGS. 1 and 3, there are three further sets of points: a set of points 15a, 15b, 15c, 15d for the door extrusion 15 in wall 111; a set of points 16a, 16b, 16c, 16d for the window extrusion 16 in wall 112; and a set of points 17a, 17b, 17c, 17d for the window extrusion 17 in the wall 112.

The set of points for the door extrusion 15 in wall 111 includes a point located at each corner 15a, 15b, 15c, 15d of the extrusion 15. The set of points for the first window extrusion 16 in wall 112 includes a point located at each corner 16a, 16b, 16c, 16d of the extrusion 16. The set of points for the second window extrusion 17 in wall 112 includes a point located at each corner 17a, 17b, 17c, 17d of the extrusion 17.

While the captured extrusion points shown in FIG. 2 are located at the corners of the respective extrusions, it should be appreciated that this is not essential. For example, a point for each edge of an extrusion, located anywhere on the edge, could also be used, especially for rectangular extrusions such as those shown in FIG. 2, because the locations of the corners of the extrusion may be inferred from the intersection of the edges. For more complex polygon extrusions, however, points located at each corner of the extrusion may be preferable. For extrusions with curved edges, one or more additional points located on the curved edge may be obtained in order to approximate the shape of the curved edge.

Significantly, the sets of the three-dimensional coordinates described above for the interior space 10 are grouped separately and not combined into a single array comprising all of the points. That is, rather than storing a single array of vertices that includes all seventeen of the points shown in FIG. 2, a first group comprising the five wall points 11a-11d and 12a; a second group comprising the four door points 15a-15d; a third group comprising the four window points 16a-16d; and a fourth group comprising the four window points 17a-17d are stored. As will be explained in more detail below, grouping the points separately allows the mesh generation processor to utilize the groups of points separately and thereby reduce the complexity of the mesh generation process.

The three-dimensional coordinates that are obtained for mesh generation may have been captured in any one of a number of different ways, including using known techniques. For example, the coordinates of the points may have been captured using a laser rangefinder. However, in preferred embodiments, the three-dimensional coordinates have been captured using an electronic device that utilizes an augmented reality toolkit, which will now be described in more detail below with reference to FIGS. 4A-4F.

Figure 4B:
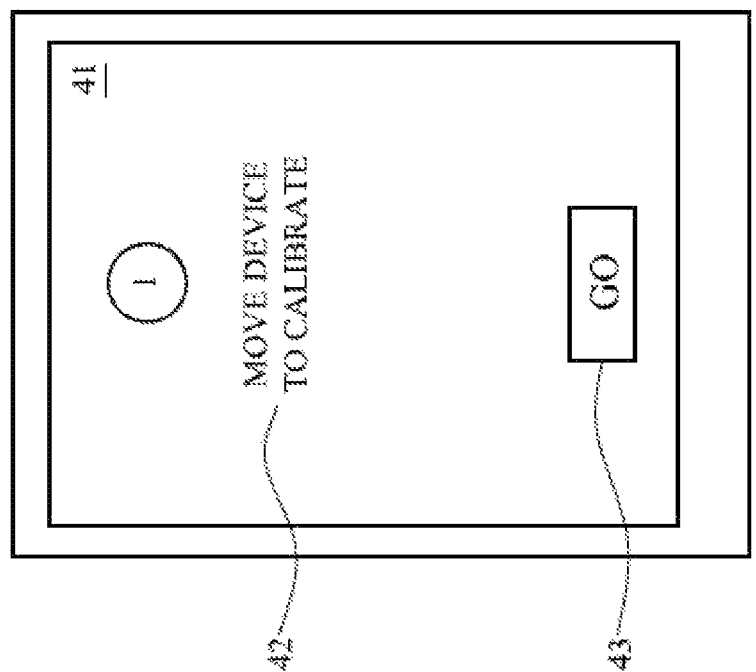
FIGS. 4A-4F are schematic diagrams illustrating how three dimensional coordinates may be captured using a mobile electronic device.
Figure 4A:
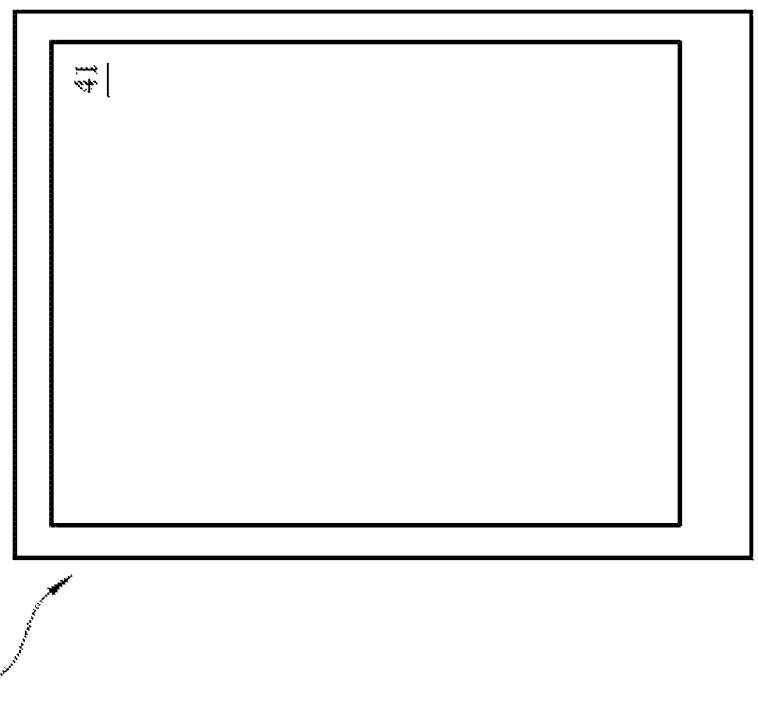

FIG. 4A illustrates a mobile electronic device 40 such as a smart phone or tablet computer. As is known, mobile electronic devices such as mobile electronic device 40 include various processors, memory, a touch display 41 that allows the device 40 to receive input from a user, and at least one camera that captures images and can provide a live view of what is being captured to the user via the display 41.

In addition to the one or more cameras, electronic devices such as device 40 typically include a range of sensors. For example, in addition to cameras, the electronic device 40 may include one or more of a GPS transceiver, an accelerometer, a gyroscope, a microphone, a compass, a magnetometer and a barometer. Electronic devices can use data captured by such sensors to derive information about their surroundings and their position and movements within the surroundings.

The capabilities of some mobile electronic devices and their associated operating systems have recently been enhanced to provide so-called augmented reality (AR) toolkits. For example, Apple (Registered Trademark) has recently released iOS 11, which includes an AR toolkit called "ARKit". Likewise, recent versions of the Android (Registered Trademark) operating system include an AR toolkit called "ARCore". AR toolkits such as ARKit and ARCore make use of the cameras and other sensors of mobile devices to deliver new functionality. For example, AR toolkits may be able to analyse a scene captured by the camera to detect vertical and horizontal planes in a scene, and track the movement of objects and other features within a scene. Augmented Reality overlays may be displayed over a live view of the images captured by the camera, in order to supplement the functionality provided to the user.

One capability that can be provided using software implemented using an AR toolkit of a mobile electronic devices 40 is the determination of three-dimensional coordinates of points of interest in images captured by the camera. When a user points the camera of their mobile electronic device 40 at a scene and is presented with a live view of the scene, they can indicate a point of interest in the scene by providing a touch input to the screen, and software implemented using the AR toolkit determines the three-dimensional coordinates of the point.

In this regard, FIGS. 4B-4F illustrate a user interface of a software application which may be used to capture the three-dimensional coordinates in step 21 of the process 20 of FIG. 2.

Referring to FIG. 4B, when a user wishes to capture three dimensional coordinates of an interior space, they may first be presented with an instruction 42 to calibrate their device 40. Calibrating the device 40 typically involves moving the device 40 around the interior space. The user may acknowledge the instruction 42 by providing a touch input, for example using the "GO" button 43, and then move their device 40 around to calibrate it.

During the calibration, the device 40 may determine one or more reference points or planes which it uses for future point capture. For example, the device 40 may identify a point, for example a point in the plane of the floor 122, and assign the point as the origin point or "absolute zero" with coordinates (0, 0, 0). The three-dimensional coordinates of all future captured points may then be relative to this absolute zero. During the calibration, the device 40 may also determine its own position and orientation relative to absolute zero.

Figure 4D:
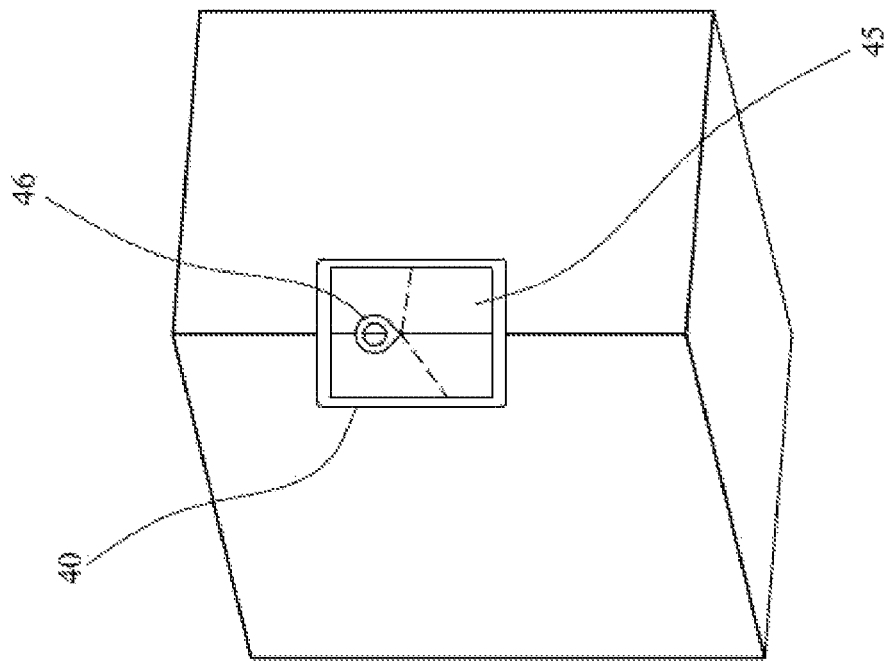
Figure 4C:
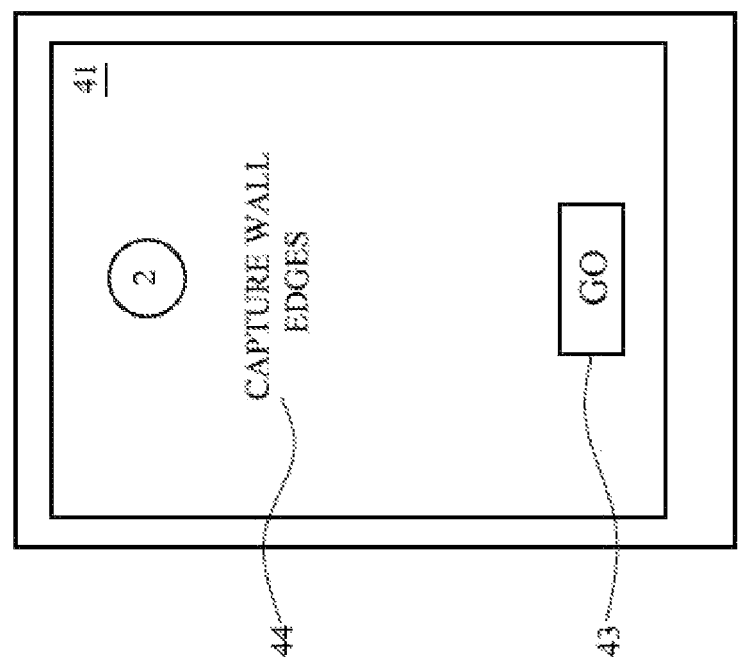

Referring to FIG. 4C, once the device 40 has been calibrated, the user is presented with an instruction 44 to capture points corresponding to the wall edges (points 11*a-d* in FIG. 3). After acknowledging the instruction 44 using the "GO" button 43, the user is presented with a live view of the images that are being captured by the camera. The user then moves the device 40 towards an edge of a wall and points the camera of the device 40 so that at least part of the edge is visible on the display 41 of the device. The user then provides an input, such as a touch input, to indicate a point located on the edge. The electronic device captures the input, determines the three-dimensional coordinate corresponding to the input point, and stores the three-dimensional coordinate.

As illustrated in FIG. 4D, the live view 45 of the images captured by the camera that are presented to the user may be overlaid with an AR overlay such as a pin 46 to show the user the locations of the points they have input. If the user mistakenly drops a pin 46, or considers that the pin 46 has not been accurately placed at a relevant point, they may be able to remove and, if necessary, replace the pin 46. The user may also be presented with other AR overlays to help them capture the relevant points. For example, the user may be presented with an AR overlay that prompts them to move the device closer to the edge, or tilt or otherwise reorient the device so as to improve the capture of the point.

The user repeats this process for all of the edges to capture all of the relevant points. As explained above with reference to FIG. 2, this may include points for all of the vertical edges and/or all of the horizontal edges. Where the ceiling 121 has a single height, the user may not need to capture, for example, horizontal edges, and may instead capture or input a single height point such as height point 12*a*. The capture/input of the height point may take place as part of the wall edge capture process, the calibration step, or in an entirely separate step.

As explained previously, all of the wall edge points are stored in association with one another as a first set of points. In this way, during mesh generation, an electronic device is able to retrieve and process the first set of points without also having to process the points of any of the extrusions. As will be described in more detail below with reference to FIGS. 5-6, this reduces the complexity of the mesh-generation processing.

Having captured the wall points, the user is now required to capture the extrusion points. This is described below with reference to FIGS. 4E-4F.

Figure 4F:
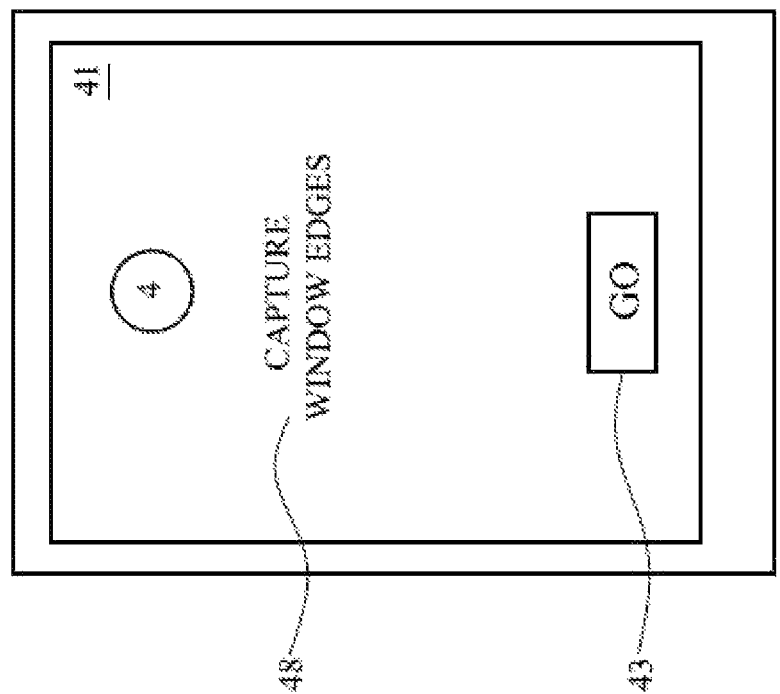
Figure 4E:
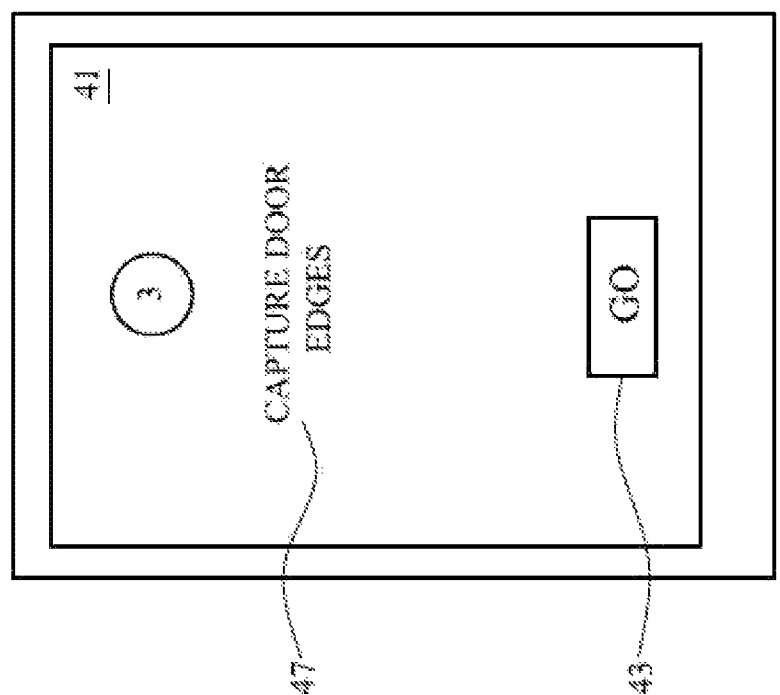

Turning to FIG. 4E, once the user has confirmed they have completed the wall point capture process, they are presented with an instruction 47 to capture points corresponding to the door edges (points 15*a-d* in FIG. 3). After acknowledging the instruction 44 using the "GO" button 43, the user is presented with a live view of the images that are being captured by the camera. The user then moves the device 40 towards an edge of the door 15 so that at least part of the edge is visible on the display 41 of the device. The user then provides an input, such as a touch input, to a location on the edge to drop a pin. The electronic device captures the input, determines the three-dimensional coordinate corresponding to the input, and stores the three-dimensional coordinate. The user then repeats this until all of the door points 15*a-d* have been captured.

As explained previously, the door points 15*a-d* are stored in association with each other as a set of points. If there are multiple doors in the interior space, each door has a separate set of points. In this way, an electronic device performing mesh-generation processing is able to process each door separately from the walls and other extrusions.

Turning to FIG. 4F, once the user has confirmed they have completed the door point capture process, they are presented with an instruction 48 to capture points corresponding to the edges of a window. As there are two windows 16, 17 for the interior space 10 of FIG. 1, the user may first capture points for one of the windows (points 16*a-d* of window 16), indicate when they have finished capturing points for the first window 16, and then capture points for the other window (points 17*a-d* of window 17).

As with the wall point capture process of FIGS. 4B-4C and the door point capture process of FIG. 4D, after acknowledging the instruction 48 using the "GO" button 43, the user is presented with a live view of the images that are being captured by camera. The user then moves the device 40 towards an edge of a window so that at least part of the edge is visible on the display 41 of the device. The user then provides an input, such as a touch input, to a location on the edge to drop a pin. The electronic device captures the input, determines the three-dimensional coordinate corresponding to the input, and stores the three-dimensional coordinate. The user then repeats this until all of the first set of window points 16*a-d* have been captured. The process is then repeated for the second set of window points 17*a-d*.

As will be appreciated from the previous explanation, the first set of window points 16*a-d* will be stored as a separate set of points, and the second set of window points 17*a-d* will be stored as a separate set of points. This allows each window to be processed separately from the other windows, extrusions and walls.

It will be appreciated that since different interior spaces have different numbers and different types of extrusions in the walls, the process described above with respect to FIGS. 4B-4F can be adapted according to the interior space. For example, before of after the calibration step illustrated in FIG. 4B, the user may be prompted to specify the types and number of extrusions that are present in the interior space. The user can then be presented with point capture instructions in accordance with the types and numbers of extrusions they have specified. As another example, for each different type of extrusion that is recognised by the software application (doors, windows and fireplaces for example), the user may be repeatedly asked to capture an extrusion of a particular type until they confirm that they have captured all of the extrusions of that type. For example, the user may first be presented with an instruction to capture door edges. Having captured a first set of door edges, the user will again be asked to capture door edges. If there are no doors left to capture, the user may be able to use the touch display 41 to select that there are no more doors to capture. The user may then be asked to capture points for an extrusion of the next type.

Advantageously, each three-dimensional coordinate is stored as soon as the corresponding user input has been received and converted into a three-dimensional coordinate. That is, rather than waiting for all points, or all points in a given set of points, to be captured before conversion and storage, conversion and storage takes place immediately after an input is received. This helps reduce the impact of so-called capture drift. Capture drift can arise due to the loss in calibration over time, for example due to the mobile electronic device 40 effectively losing its position and orientation within the space, which it established during the calibration step. Capture drift increases over time, especially following sudden changes in device position and orientation, so converting an input and storing the resulting coordinate as the input is captured reduces the amount of capture drift associated with each three-dimensional coordinate.

While the points can be captured using any point capture process, it will be appreciated that the point capture process described above with reference to FIGS. 4A-4F has the advantage that it does not require any specialized equipment or any specialist skills. While the three-dimensional coordinates captured using this process may be relatively inaccurate compared to, for example, points captured by a trained individual using a laser rangefinder, the separation of the points into separate sets, along with the normalization and parallelization techniques described below with reference to FIG. 5, allow the mesh generation techniques described below to create accurate virtual representations of the interior space.

After having completed the point capture process of FIGS. 4A-4F, or another point capture process, a first set of points representing wall edges and at least one further set of points representing extrusions are available for use by an electronic device in order to generate a mesh representing the interior space. Mesh generation will now be described with reference FIGS. 5-6.

Figure 5:
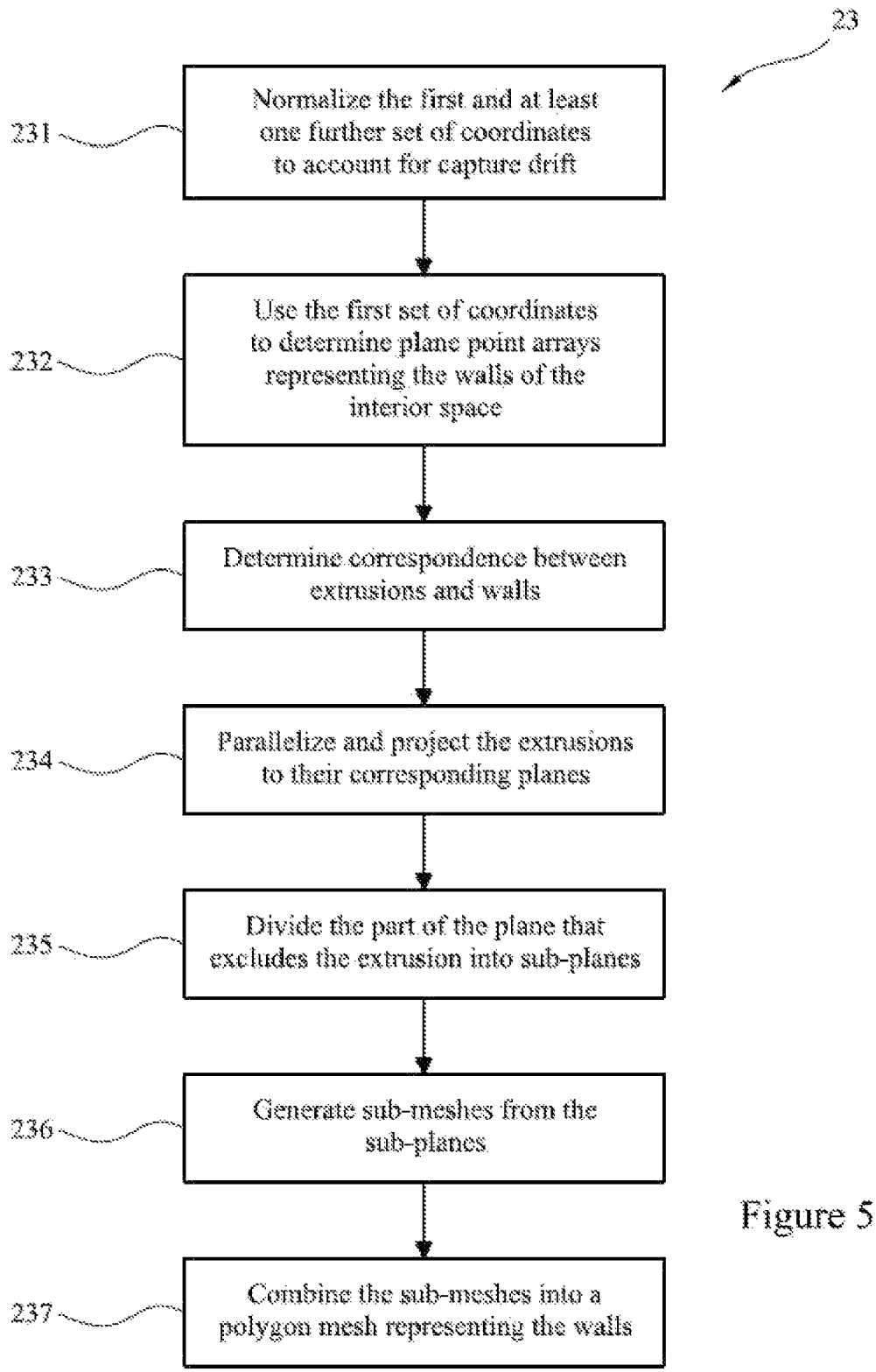
FIG. 5 is a flow diagram illustrating a process of generating a polygon mesh from sets of three-dimensional coordinates.

FIG. 5 illustrates the mesh generation process 23 of FIG. 2 in more detail.

Firstly, in step 231, an electronic device such as electronic device 40 normalizes the first set of coordinates obtained in step 22 of process 20 to account for capture drift.

As explained above, in order to reduce the effect of capture drift, user inputs are preferably converted to three-dimensional coordinates and stored as soon as the user inputs are received. However, there is still likely to be some capture drift in the obtained three-dimensional coordinates, especially for the later-captured points, so an initial normalization of the first set of coordinates is preferably performed to improve the accuracy of the polygon mesh that will be generated from the points.

Normalizing the first set of three-dimensional coordinates involves comparing the x-, y- and z-coordinate values of the points and making adjustments to the values to create a set of coordinates that more accurately describe the walls, ceiling and floor of the interior space. Such a set of points should be internally consistent, and well-constrained given the constraints of the interior space. For example, it will be appreciated that each point representing a vertical edge should lie in two different planes of the interior space (that is, an edge point should lie in the planes of two adjacent walls, where the wall planes intersect). However, capture drift may mean that some of the captured coordinates are not accurate, and that the requirement that each point lies in two planes cannot be met at the same time for each and every one of the captured wall edge points. As another example, capture drift and/or inaccuracies in point capture may mean that there is angle between adjacent walls, or a ceiling or floor is sloped, even for interior spaces where the walls are actually perpendicular and/or the ceiling flat. The normalization process makes adjustments to the coordinate values to account for capture drift and other inaccuracies.

Figure 6B:
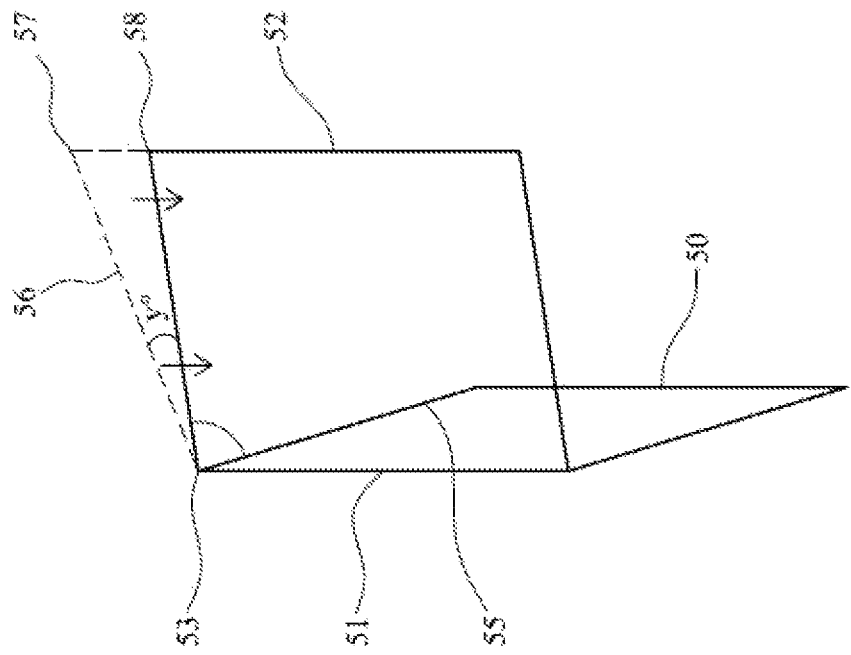
Figure 6A:
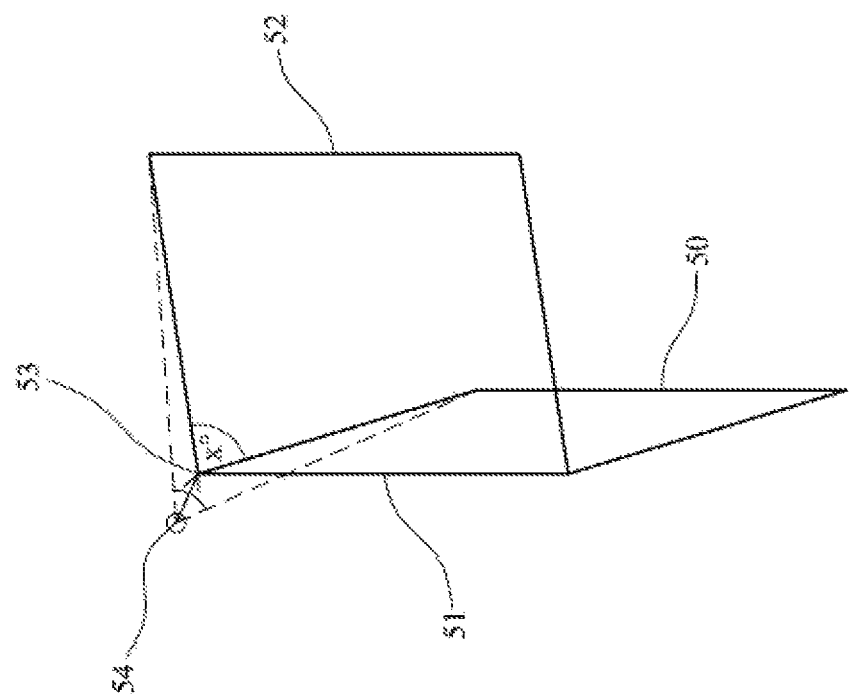

An example of a normalization process is illustrated in FIGS. 6A and 6B.

FIG. 6A illustrates the normalization of points on vertical edges. In this example, points lying on three vertical edges 50, 51 and 52 have been captured during the point capture process 21. Assuming vertical planes through these points, the vertical edges 50, 51, 52 define two adjacent walls which form an angle, x, between them. As part of the normalization process 231, the angle x may be compared to a predefined threshold/tolerance and the coordinates of one or more points of the vertical edges 50, 51, 52 adjusted if the angle x passes the threshold/tolerance.

For example, if the difference between the angle x and 90 degrees is less than the predefined tolerance (5 degrees, for example), it may be assumed that the two walls are actually perpendicular to each other and that the difference in angle is due to capture drift and/or inaccurate point capture. In this case the coordinates of corner point 53 may be adjusted. In particular, the coordinates of points 53 may be adjusted to those of point 54, which results in the angle between the two wall planes being 90 degrees.

Alternatively, if the difference between the angle x and 90 degrees is greater than the predefined tolerance, it may be assumed that there actually is an angle between the two walls, because a difference greater than the tolerance is unlikely to be solely a result of capture drift and/or inaccurate point capture. In this case, the coordinates of the points may not be adjusted.

Referring now to FIG. 6B, this illustrates the normalization of points on horizontal edges. In this example, points on horizontal edges 55 and 56 have been captured during the point capture process 21. Assuming the edges 55 and 56 intersect at a point 53 on the vertical edge 51, the edge 56 forms an angle, y, with the horizontal. That is, the edge 56 as defined by the captured point results in a sloped ceiling with an angle y to the horizontal. As part of the normalization process 231, the angle y may be compared to a predefined threshold/tolerance and the coordinates of one or more points of the horizontal edges 55, 56 adjusted if the angle y passes the threshold/tolerance.

For example, if the angle y is less than the predefined tolerance (10 degrees, for example), it may be assumed that the ceiling is actually not sloped, and that the angle y is due to capture drift and/or inaccurate point capture. In this case the coordinates of corner point 53 may be adjusted. In particular, the coordinates of points 57 may be adjusted to those of point 58, which results in a truly horizontal edge that defines a flat ceiling.

Alternatively, if the angle y is greater than the predefined tolerance, it may be assumed that the ceiling actually is sloped, because a difference greater than the tolerance unlikely to be solely a result of capture drift and/or inaccurate point capture. In this case, the coordinates of the points may not be adjusted.

The predefined thresholds/tolerances described above may vary depending on the AR toolkit being used. For example, for AR toolkits that experience relatively little capture drift and/or inaccuracies, the tolerances may be reduced. Other factors may make it preferable to adjust the tolerance. For example, point capture tends to be less accurate for points lying on horizontal edges, as users may not be able to get as close to a horizontal edge as a vertical edge because some horizontal edges are at ceiling-level. A higher threshold/tolerance may therefore be used for the normalization of points on horizontal edges.

The normalization process 231 may also be applied to the at least one further set of coordinates representing the extrusions, to ensure that the points representing an extrusion lie in a common plane. However, as the extrusions may be parallelized to their respective wall planes in step 234 described below, it may not be necessary to normalize the at least one further set of coordinates.

Next, in step 232, the first set of coordinates is used to determine point arrays that define the planes that represent the walls of the interior space. That is, points located at the extreme corners of the planes representing the walls (i.e. the points where the wall meets the ceiling or floor) are determined.

Figure 6D:
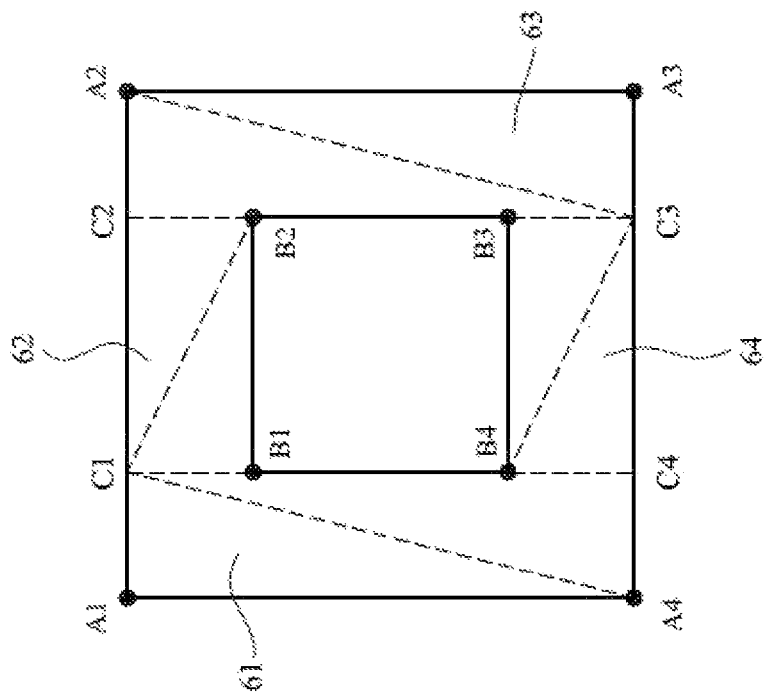
Figure 6C:
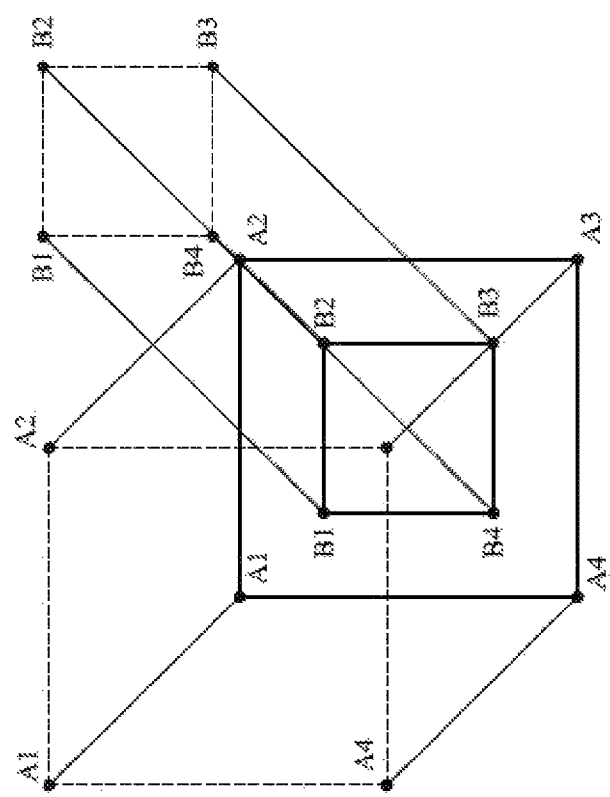

To illustrate this, with reference to FIGS. 1 and 3, two edge points have been captured for the wall 114 of the interior space 10: points 11b and 11c. Utilizing these two edge points 11b and 11c, and also utilizing absolute zero and the height point 12a, the four corner points located at the extreme corners of the wall plane can be determined. For example, the three-dimensional coordinate (x, y, z) of the top left corner of the wall 114 can be determined using the x- and y-coordinates of the point 11b and the z-coordinate of the height point 12a. The three-dimensional coordinate of the bottom left corner of the wall 114 can be determined using the x- and y-coordinates of the point 11b and the z-coordinate of absolute zero. The three-dimensional coordinate of the top right corner of the wall 114 can be determined using the x- and y-coordinates of the point 11a and the z-coordinate of the height point 12a. The three-dimensional coordinate of the bottom right corner of the wall 114 can be determined using the x- and y-coordinates of the point 11a and the z-coordinate of absolute zero. Turning to FIGS. 6C and 6D, described in more detail below, it can be seen that there are four corner points A1-A4 for a wall. Such corner points are the output of step 232.

Next, in step 233, the correspondence between the walls and the extrusions is determined. That is, it is determined which extrusion (defined by its associated set of points) belongs to which wall/plane.

In one example, in order to determine which wall a given extrusion belongs to, an angle between the plane in which the extrusion lies (as defined the set of points representing the given extrusion) and a wall plane is determined. If the angle between the plane of the extrusion and the plane of the wall is small, for example less than a threshold such as 5 degrees, the extrusion is determined to belong to that wall. If the angle is above the threshold, the angle is calculated for another wall plane and this is repeated until the angle is below the threshold. If no calculated angle is below the threshold, the wall plane which generated the smallest calculated angle may be chosen.

It will be appreciated that each extrusion should lie in the plane of its associated wall, so if there are no inaccuracies in the point capture process, the angle should be zero for the associated wall. However, due to inaccuracies in the capture process and due to capture drift, the calculated angle will not typically be zero, so a threshold is used. The threshold that is used can be varied. For example, if the adjacent walls of the interior space are expected to be perpendicular, a larger threshold can be used. This is because the possibility of a mistaken determination will only arise if the smallest angle between a wall and an extrusion is approaching about 45 degrees, and it is unlikely that inaccuracies in the capture process would be so significant that they would result in such a large angle. On the other hand, if the angle between adjacent walls could be quite shallow, a smaller threshold would be appropriate as otherwise a mistaken determination could be made. In general, the threshold angle should be smaller than the shallowest angle between adjacent walls of the interior space.

It will also be appreciated that in many interior spaces (including interior space 10 of FIGS. 1 and 3), opposite walls are parallel or close to parallel, so a small angle may be determined for two different walls. Therefore, to avoid mistaken determinations based on the angle between the extrusion and the wall plane, a distance (such as a distance between the centres of the wall plane and extrusion) may be used in the determination of the correspondence. If there is a large distance between the extrusion and wall plane, the extrusion will not belong to that wall, even if the angle between the extrusion and wall is small.

Next, in step 234, for each extrusion, the extrusion is parallelized to and projected to its corresponding wall plane. This is illustrated in FIG. 6C, in which an extrusion represented by extrusion corner points B1-B4 is parallelized onto and projected or translated onto the wall plane represented by the wall corner points A1-A4.

If there were no inaccuracies in the point capture process, the extrusions would already be parallel to their respective wall planes. However, inaccuracies and capture drift mean that this may not be the case. The x-, y- and z-coordinates of the points representing the extrusions may therefore be analysed and adjusted so that the planes defined by the extrusions are parallel to their respective planes. It is noted that the extrusions are parallelized to the wall planes, and not vice versa. Projecting the wall planes onto the planes of the extrusions could result in a set of wall planes in which some of the adjacent walls do not share a common edge, and do not together create a closed set of walls.

Having parallelized the extrusions onto their corresponding wall planes, all of the extrusions belonging to a given wall are projected or translated onto said wall, as illustrated in FIG. 6C. The result, an example of which is shown in FIG. 6D, is a wall plane (defined by points A1-A4) containing void(s) corresponding to its extrusion(s), as can be seen in FIG. 6D. A more complex example of a wall plane containing two voids 18, 19 is shown in FIG. 6E.

Figure 6E:
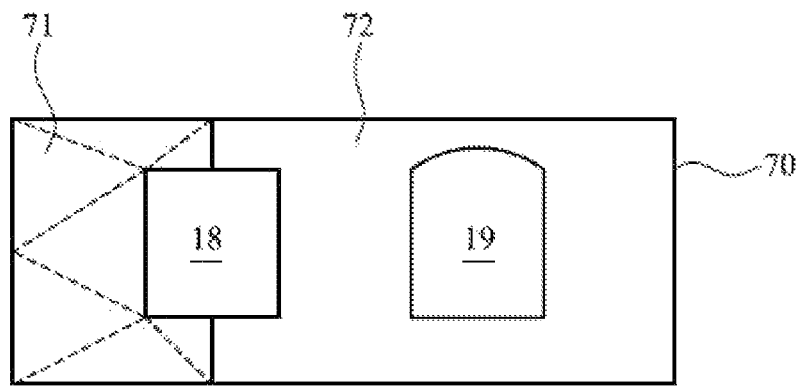

Now turning to step 235 in FIG. 5, the part of the plane illustrated in FIGS. 6D and 6E that does not include the projected extrusion(s) is divided into a plurality of sub-planes. That is, the complex shape that encloses/encapsulates the extrusions/voids (a single extrusion/void B1-B4 in FIG. 6D and two extrusions 18, 19 in FIG. 6E) is divided into a plurality of simple shapes that do not enclose/encapsulate the extrusion/void.

Figure 6F:
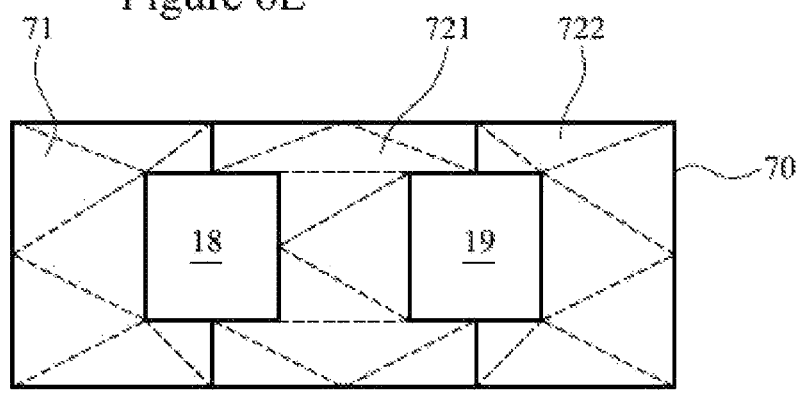
Figure 6G:
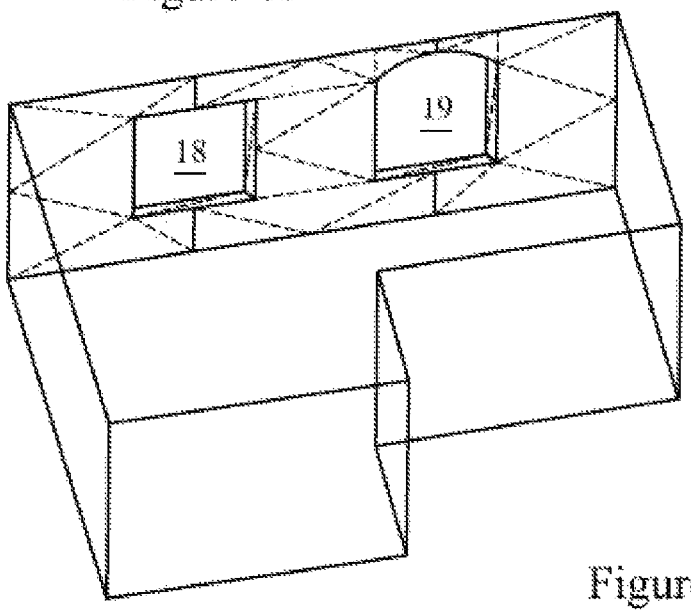

Dividing the wall plane, less the extrusions, into sub-planes may involve performing an extrapolation technique based on the minima and maxima points of the extrusions. An extrapolation technique is illustrated in FIG. 6D. Alternatively, it may involve a splicing technique that dissects the plane based upon the central point of the extrusion/void. A splicing technique is illustrated in FIGS. 6E-6G.

FIG. 6D illustrates an extrapolation technique which divides the plane less the void into four rectangular sub-planes 61, 62, 63, 64 that individually do not encapsulate the extrusion. In particular, in FIG. 6B, the horizontal minima are represented by points B1 and B4, and the horizontal maxima are represented by points B2 and B3. A vertical line through the horizontal minima points B1 and B4 is extrapolated to where it intersects the wall plane, at points C1 and C4. Likewise, a vertical line through the horizontal maxima points B2 and B3 is extrapolated to where it intersects the wall plane, at points C2 and C3. This creates a first rectangular sub-plane 61 defined by points A1, C1, C4 and A4; a second rectangular sub-plane 62 defined by points C1, C2, B2 and B1; a third rectangular sub-plane 63 defined by points C2, A2, A3 and C3, and a fourth rectangular sub-plane 64 defined by points B4, B3, C3 and C4.

It will be appreciated that the extrapolation technique described above could equally be applied using horizontal lines through the vertical minima B3 and B4 and the vertical maxima B1 and B2. The result would be four different, but essentially equivalent, rectangular sub-planes.

It will also be appreciated that the technique could be applied to a wall plane with multiple voids, such as for wall 112 of interior space 10 in FIG. 1. Performing the extrapolation technique for the wall 112 could, for example, divide the wall plane into five rectangular sub-planes.

FIGS. 6E-6G illustrate an exemplary splicing technique for dividing a wall plane 70, less its extrusions/voids 18, 19, into a plurality of sub-planes 71, 721, 722 that individually do not encapsulate the extrusions 18, 19.

According to the splicing technique, referring to FIG. 6E, the left-most extrusion 18 in the wall 70 is considered first. A vertical line through the centre of the extrusion 18 is extrapolated to where it intersects the wall plane 70, resulting in two regions of the wall plane: a first region 71 to the left of the centre of the extrusion 18 and a second region 72 to the right of the centre of the extrusion 18. Since the left-most extrusion 18 has been considered first, the region 71 to the left the extrusion 18 does not encapsulate any extrusion or void, and is therefore considered to be a first sub-plane 71. If the wall plane 70 only had one extrusion, the second region 72 to the right of the centre of the extrusion 18 would also not encapsulate a void, so could be used as a sub-plane. However, since the wall plane 70 includes a second extrusion 19, the second region 72 to the right of the left-most extrusion 18 encapsulates extrusion 19, so a further splicing step is required.

Now referring to FIG. 6F, a vertical line through the centre of the other extrusion 19 is extrapolated to where it intersects the wall plane 70. This divides the second region 72 of FIG. 6E into two regions: a region 721 that is to left of the centre of the extrusion 19 (and to the right of the centre of the extrusion 18) and a region 722 that is to right of the extrusion 19. Since neither of the regions 721, 722 encapsulate any extrusion, they are considered to be second and third sub-planes 721, 722 of the wall plane 70.

Finally, referring to FIG. 6G, this illustrates the wall plane 70 in the wider context of a 3D interior space.

It will be appreciated that if the wall plane 70 included further extrusions, the above process would be repeated until no regions encapsulate an extrusion. It will also be appreciated that modifications could be made to the splicing technique. For example, the splicing technique could start with the most-right extrusion 19 rather than the most-left extrusion 18. Also, horizontal lines through the centres of the extrusions could be used instead of vertical lines.

In the example of FIGS. 6E-6G, this would have resulted in two sub-planes rather than three, though it will be appreciated that the two sub-planes would have been of a more complex shape.

Having divided the plane, less the extrusion(s) into the sub-planes, in step 236 of FIG. 5, sub-meshes are generated from the sub-planes. This involves performing a polygon generation process on the sub-planes, preferably a polygon triangulation process which generates triangles from the sub-planes.

Referring again to FIG. 6D, the triangles generated from the sub-planes are shown in dotted lines. A sub-mesh consisting of two triangles is generated from the first sub-plane 61 by joining points A4 and C1. A sub-mesh consisting of two triangles is generated from the second sub-plane 62 by joining points B2 and C1. A sub-mesh consisting of two triangles is generated from the third sub-plane 63 by joining points A2 and C3. A sub-mesh consisting of two triangles is generated from the fourth sub-plane 64 by joining points B4 and C3. It will be understood that other triangles could also be generated.

It will be appreciated that since the sub-planes 61-64 have simple shapes, the generation of the sub-meshes in step 236 is relatively simple and computationally efficient. In contrast, had a polygon generation process been performed on a single set of points comprising points A1-A4 and B1-B4, the connection of vertices and edges to form polygons would have been more complex and computationally demanding. By obtaining and utilizing the wall points and extrusion points separately, so as to create simple shapes for the mesh generation step 236, the examples described herein save on processing and can be performed in real-time.

Referring now to FIGS. 6E-6G, the triangles generated from the sub-planes 71, 721, 722 are shown in dotted lines. It will be appreciated that since the sub-planes 71, 721, 722 have a more complex shape than the sub-planes 61-64 of FIG. 6D, the sub-mesh generation is more complex in FIGS. 6E-6G, and each sub-mesh comprises more triangles. However, compared to a polygon generation process performed on a single set of points comprising the four corner points of the wall plane 70, the four corner points of the first extrusion 18 and the four corner points of the second extrusion 19, the polygon generation process illustrated in FIGS. 6E-6G is still less computationally demanding.

Finally, in step 237, for each wall, the sub-meshes that are generated from the sub-planes in step 236 are combined to give a single mesh that represents a wall of the interior space.

An extrapolation technique such as the technique illustrated in FIG. 6D may be preferred for walls that include extrusions which have a regular polygon shape, as an extrapolation technique will tend to produce sub-planes of a particularly simple shape. This advantageously simplifies the sub-mesh generation of step 236.

However, a splicing technique such as the technique illustrated in FIGS. 6E-6G may be preferred for both regular and irregular extrusions. This is partly because it is advantageous from a memory bandwidth perspective to be able to use a single technique for all extrusions, regardless of their shape, but also because a splicing technique will tend to produce less sub-planes than an extrapolation technique. Although the shapes of such sub-planes may be more complex, such that the sub-mesh generation of step 236 is more complex for each sub-plane, less sub-meshes overall have to be generated. Further, less sub-meshes must be combined in step 237.

Now returning to process 20 of FIG. 2, having generated a polygon mesh for each wall of the interior space in step 23, in step 24 the polygon meshes representing the three-dimensional shapes of the walls are provided to a rendering engine for creating a virtual representation of the interior space.

In some cases, the polygon meshes that are generated for each wall are combined into a single polygon mesh representing the entire interior space before being provided to the rendering engine. Such a mesh is illustrated in FIG. 6H (it is noted that the extrapolation technique of FIG. 6D has been used for this interior space). However, in other cases, the polygon meshes representing the individual walls are not combined, but are provided separately to the rendering engine. In other cases still, the polygon meshes representing the individual walls are combined into two or more groups, each having a one or more walls, and the groups are then separately provided to the rendering engine.

While the manner in which the meshes are provided to the rendering engine does not change the end result of the rendering, the latter two approaches allows a wall or a group of walls to subsequently be re-rendered without having to re-render the other walls or groups of walls. For example, a user may wish to make changes to one wall (a "feature wall", for example), either at the level of the polygon mesh (the addition of an extrusion to a wall, for example) or at the rendering level (a change to the surface decoration of the wall, for example), without wishing to make changes to the other walls. The latter two approach permits this, without necessarily requiring computationally demanding rendering to be performed for the entire interior space.

Described above are a number of embodiments with various optional features. It should be appreciated that, with the exception of any mutually exclusive features, any combination of one or more of the optional features are possible.

The invention claimed is:

1. A method for generating a virtual representation of an interior space such as a room, comprising:
obtaining a first set of three-dimensional coordinates and at least one further set of three-dimensional coordinates, wherein the first set of three-dimensional coordinates comprises three-dimensional coordinates representing three-dimensional positions of points located on edges of walls of the interior space, and wherein each of the at least one further set of three-dimensional coordinates comprises three-dimensional coordinates representing positions of points located on edges of an extrusion in one of the walls of the interior space;
generating a polygon mesh representing the three-dimensional shape of the interior space, wherein generating the polygon mesh comprises:
using the first set of three-dimensional coordinates to determine planes representing the walls of the interior space without considering any extrusions in the walls; and
for each wall with one or more extrusions, using the respective determined plane and the respective one or more of the at least one further set of three-dimensional coordinates to determine a plurality of sub-meshes that in combination represent the respective wall excluding the respective one or more extrusions; and combining the plurality of sub-meshes into a mesh representing the wall with the one or more extrusions; and
determining, for each of the at least one further set of three-dimensional coordinates, which of the determined planes the extrusion belongs to;
wherein determining which of the determined planes the extrusion belongs to comprises comparing the orientation of a plane through the points representing positions of points located on edges of the extrusion to the orientation of the determined planes.

2. The method of claim 1, further comprising normalizing the three-dimensional coordinates of the first set of three-dimensional coordinates and/or the at least one further set of three-dimensional coordinates to account for capture drift.

3. The method of claim 1, further comprising, for each wall without any extrusions, using the corresponding plane to determine a mesh representing the wall.

4. The method of claim 1, further comprising combining all the meshes representing all walls of the interior space to give a single mesh representing the three-dimensional shape of the interior space.

5. The method of claim 4, further comprising providing the single polygon mesh representing the three-dimensional shape of the interior space to a renderer for rendering the polygon mesh to generate a virtual representation of the interior space.

6. The method of claim 1, further comprising providing one or more polygon meshes to a renderer for rendering the one or more polygon meshes, wherein each of the one or more polygon meshes represents the three-dimensional shape of one or more walls of the interior space.

7. The method of claim 1, wherein using the respective determined plane and the respective one or more of the at least one further set of three-dimensional coordinates to determine a plurality of sub-meshes that in combination represent the respective wall excluding the respective one or more extrusions comprises: translating or projecting the respective extrusion onto the respective plane.

8. The method of claim 7, further comprising parallelizing the extrusion to the plane prior to translating or projecting the extrusion onto the plane.

9. The method of claim 1, wherein using the respective determined plane and the respective one or more of the at least one further set of three-dimensional coordinates to determine a plurality of sub-meshes that in combination represent the respective wall excluding the respective one or more extrusions comprises: dividing the plane less the one or more extrusions into a plurality of sub-planes; and generating a sub-mesh for each sub-plane.

10. The method of claim 9, wherein dividing the plane less the one or more extrusions into a plurality of sub-planes comprises at least one of:
performing an extrapolation technique; or
performing a splicing technique.

11. The method of claim 10, wherein the extrapolation technique comprises, for each of the one or more extrusions, dissecting the plane along lines through a minimum and maximum extent of the extrusion.

12. The method of claim 10, wherein the splicing technique comprises, for each of the one or more extrusions, dissecting the plane through a central point of the extrusion.

13. The method of claim 1, wherein the polygons are triangles.

14. The method of claim 1, wherein the first set of three-dimensional coordinates comprises at least one of:
a three-dimensional coordinate for each vertical edge, wherein a vertical edge is an edge where two adjacent walls of the interior space meet;
a three-dimensional coordinate for each horizontal edge, wherein a horizontal edge is an edge where a wall of the interior space meets a ceiling or floor of the interior space; or
at least one height point indicating the height of the interior space.

15. The method of claim 1, wherein an extrusion in a wall is a door, window or fireplace in the wall.

16. The method of claim 1, wherein obtaining the first set of three-dimensional coordinates comprises: displaying, on a display of an electronic device, a live view of the interior space as captured by a camera of the electronic device; and for each of the edges, receiving a user input indicating a point on the display corresponding to the edge; converting the user input into a three-dimensional coordinate; and storing the three-dimensional coordinate in memory of the electronic device.

17. The method of claim 16, wherein an augmented reality toolkit of the electronic device is used to convert the user input into the three-dimensional coordinate.

18. The method of any of claim 16, wherein the user input is converted into a three-dimensional coordinate and stored in memory as soon as the user input is received.

19. The method of claim 1, wherein obtaining each of the at least one further set of three-dimensional coordinates comprises: displaying, on a display of an electronic device, a live view of the interior space as captured by a camera of the electronic device; and for each of the extrusions, receiving user inputs indicating points on the display corresponding to the edges of the extrusion; converting the user input into the three-dimensional coordinates; and storing the three dimensional coordinates in memory of the electronic device.

20. The method of claim 1, wherein obtaining the first set of three-dimensional coordinates and/or the at least one further set of three-dimensional comprises retrieving a previously captured set of three-dimensional from memory of an electronic device.

21. A method for generating a virtual representation of an interior space such as a room, comprising:
   obtaining a first set of three-dimensional coordinates and at least one further set of three-dimensional coordinates, wherein the first set of three-dimensional coordinates comprises three-dimensional coordinates representing three-dimensional positions of points located on edges of walls of the interior space, and wherein each of the at least one further set of three-dimensional coordinates comprises three-dimensional coordinates representing positions of points located on edges of an extrusion in one of the walls of the interior space;
   generating a polygon mesh representing the three-dimensional shape of the interior space, wherein generating the polygon mesh comprises:
      using the first set of three-dimensional coordinates to determine planes representing the walls of the interior space without considering any extrusions in the walls; and
      for each wall with one or more extrusions, using the respective determined plane and the respective one or more of the at least one further set of three-dimensional coordinates to determine a plurality of sub-meshes that in combination represent the respective wall excluding the respective one or more extrusions; and combining the plurality of sub-meshes into a mesh representing the wall with the one or more extrusions; and
   normalizing the three-dimensional coordinates of the first set of three-dimensional coordinates and/or the at least one further set of three-dimensional coordinates to account for capture drift;
   wherein normalizing the three-dimensional coordinates of the first set of three-dimensional coordinates and/or the at least one further set of three-dimensional coordinates comprises comparing an angle between two planes to a predetermined threshold angle, and adjusting at least one three-dimensional coordinate if the angle passes the threshold.

22. A non-transitory computer-readable medium storing instructions which, when executed by a computer, cause the computer to:
   obtain a first set of three-dimensional coordinates and at least one further set of three-dimensional coordinates, wherein the first set of three-dimensional coordinates comprises three-dimensional coordinates representing three-dimensional positions of points located on edges of walls of the interior space, and wherein each of the at least one further set of three-dimensional coordinates comprises three-dimensional coordinates representing positions of points located on edges of an extrusion in one of the walls of the interior space;
   generate a polygon mesh representing the three-dimensional shape of the interior space, wherein generating the polygon mesh comprises:
      use the first set of three-dimensional coordinates to determine planes representing the walls of the interior space without considering any extrusions in the walls; and
      for each wall with one or more extrusions, use the respective determined plane and the respective one or more of the at least one further set of three-dimensional coordinates to determine a plurality of sub-meshes that in combination represent the respective wall excluding the respective one or more extrusions; and combining the plurality of sub-meshes into a mesh representing the wall with the one or more extrusions; and
   determine, for each of the at least one further set of three-dimensional coordinates, which of the determined planes the extrusion belongs to;
   wherein to determine which of the determined planes the extrusion belongs to comprises to compare the orientation of a plane through the points representing positions of points located on edges of the extrusion to the orientation of the determined planes.

23. A computer system comprising one or more processors communicatively coupled to memory and configured to:
   obtain a first set of three-dimensional coordinates and at least one further set of three-dimensional coordinates, wherein the first set of three-dimensional coordinates comprises three-dimensional coordinates representing three-dimensional positions of points located on edges of walls of the interior space, and wherein each of the at least one further set of three-dimensional coordinates comprises three-dimensional coordinates representing positions of points located on edges of an extrusion in one of the walls of the interior space;
   generate a polygon mesh representing the three-dimensional shape of the interior space, wherein generating the polygon mesh comprises:
      use the first set of three-dimensional coordinates to determine planes representing the walls of the interior space without considering any extrusions in the walls; and
      for each wall with one or more extrusions, use the respective determined plane and the respective one or more of the at least one further set of three-dimensional coordinates to determine a plurality of sub-meshes that in combination represent the respective wall excluding the respective one or more extrusions; and combining the plurality of sub-meshes into a mesh representing the wall with the one or more extrusions; and
   determine, for each of the at least one further set of three-dimensional coordinates, which of the determined planes the extrusion belongs to;
   wherein to determine which of the determined planes the extrusion belongs to comprises to compare the orientation of a plane through the points representing positions of points located on edges of the extrusion to the orientation of the determined planes.

\* \* \* \* \*